A. W. LIVINGSTON.
METHOD OF RADIALLY CORRUGATING SHEET METAL.
APPLICATION FILED MAY 20, 1914.

1,159,322.

Patented Nov. 2, 1915.

WITNESSES:
Charles Pickles
Thos Eastberg

INVENTOR
Andrew W. Livingston
BY G. H. Strong
ATTORNEY

A. W. LIVINGSTON.
METHOD OF RADIALLY CORRUGATING SHEET METAL.
APPLICATION FILED MAY 20, 1914.
1,159,322.
Patented Nov. 2, 1915.
2 SHEETS—SHEET 2.
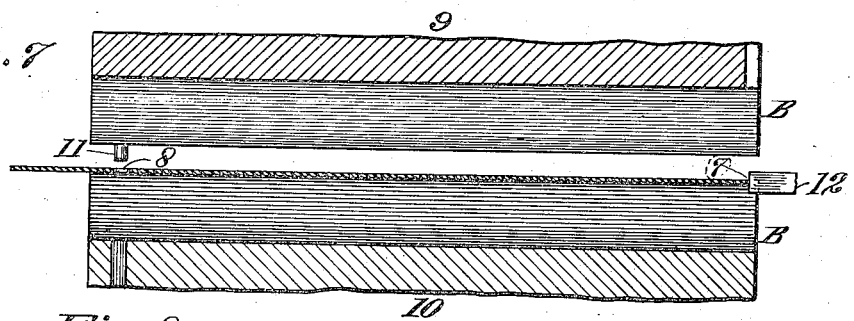
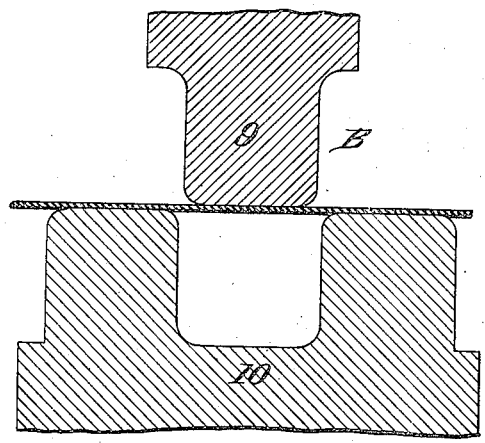
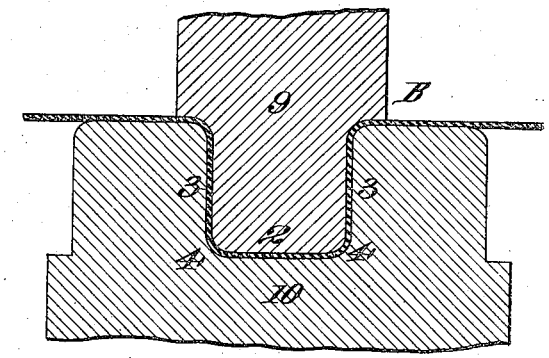
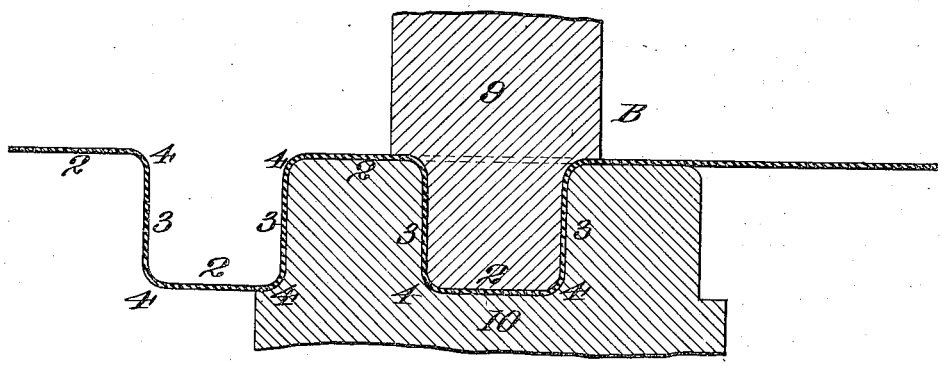

UNITED STATES PATENT OFFICE.

ANDREW W. LIVINGSTON, OF OAKLAND, CALIFORNIA, ASSIGNOR TO STANDARD STEEL WHEEL AND TIRE ARMOR COMPANY, OF OAKLAND, CALIFORNIA, A CORPORATION OF ARIZONA.

METHOD OF RADIALLY CORRUGATING SHEET METAL.

1,159,322. Specification of Letters Patent. Patented Nov. 2, 1915.

Application filed May 20, 1914. Serial No. 839,730.

*To all whom it may concern:*

Be it known that I, ANDREW W. LIVINGSTON, a citizen of the United States, residing at Oakland, in the county of Alameda and State of California, have invented new and useful Improvements in Methods of Radially Corrugating Sheet Metal, of which the following is a specification.

This invention relates to a method of making seamless, radially corrugated metal sheets, plates or disks, in which the corrugations are of considerable depth, and it pertains especially to the manufacture of wheels and disk spoke constructions of the character shown and described in my Patent #1,065,537, dated June 24, 1913. In the wheel shown and described in said patent, I employ a spoke structure, provided with radial corrugations or indented ribs, the convolutions forming the corrugations being of substantially the same depth from the center to the periphery of the spoke structure, and it was in my effort to evolve a satisfactory method of commercially manufacturing such a spoke construction that led to the present invention.

The invention consists of the parts and the construction and combination of parts, as hereinafter fully described and claimed, having reference to the accompanying drawings, in which—

Figure 1:
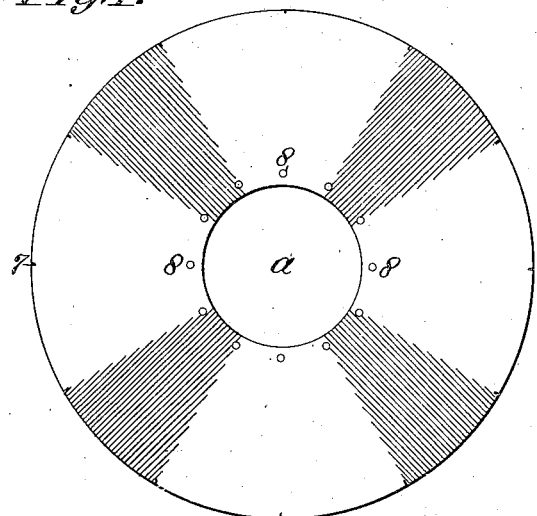
Figure 2:
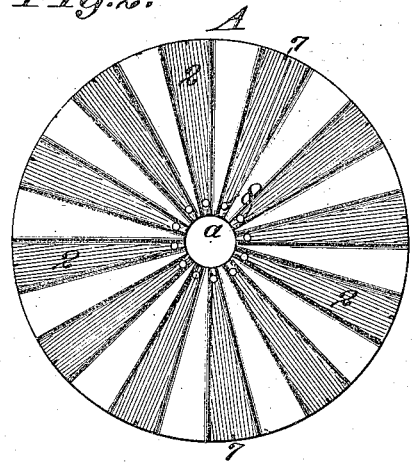
Figure 3:
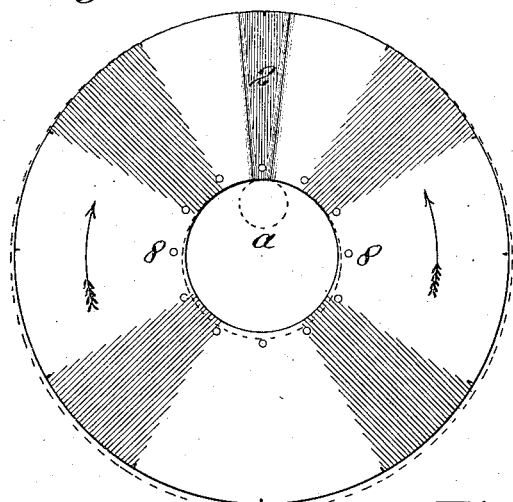
Figure 4:
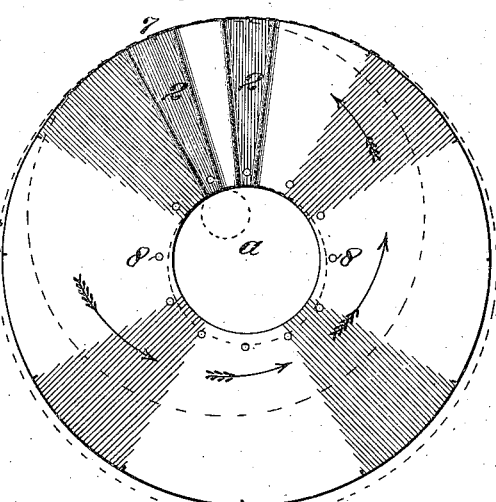
Figure 5:
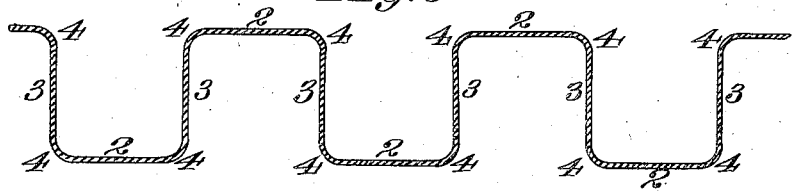
Figure 6:
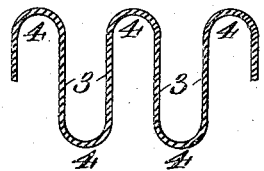

Figure 1 is a view of the wheel disk blank. Fig. 2 is a view of the corrugated disk. Fig. 3 is a view of the first operation of corrugating. Fig. 4 is a view of the second operation of corrugating. Fig. 5 is an enlarged detail projected section of a disk between the eye and periphery. Fig. 6 is an enlarged detail projected section of the eye of the disk. Fig. 7 is a detail longitudinal section of the corrugating dies. Fig. 8 is an enlarged detail cross section of corrugating dies in position to form corrugation. Fig. 9 is an enlarged detail section of corrugating dies in first operation. Fig. 10 is an enlarged detail cross section of corrugating dies in second operation.

A represents a corrugated sheet, made according to the invention, having a central hole a, and in which sheet the radial corrugations are of substantially the same depth from center to the periphery of the sheet; the bottoms 2 of the corrugations or indentations being substantially flat and gradually flared from the center to the periphery. Substantially the entire bottom of each corrugation on one side of the sheet lies in the same plane, and substantially the entire part of every bottom on the other side of the sheet lies in another plane; both planes being parallel with each other. Also, the corrugations or indentations extend from the center of the wheel to the periphery, so that when the corrugated disk is slipped on to a hub, it is given a rigid support against sidewise rocking motion; similarly, a rim has a maximum footing support on the ends of the spoke ribs. The walls 3 of the corrugations extend radially and are substantially straight except where they lead at each side into the body of the sheet by uniform curves 4 at the angles formed with the alternate bottoms. Owing to the depth of the corrugations in this construction, it has been found a physical impossibility to stamp such a sheet at one operation, or in fact to make more than a single corrugation or spoke at one operation. The chief reason for the difficulty lies in the fact that the finished product, indicated in Fig. 2, is at least six inches smaller in diameter than the blank illustrated in Fig. 1, that it is formed from. If two opposite spokes were attempted to be formed in one operation, the center or pitch line, similar to the pitch line of a gear, would come into effect and the metal be gripped so that it would be impossible for it to move toward the center, which it necessarily must do.

My invention therefore resides essentially in stamping the material so that shrinkage in diameter takes place coördinately with the stamping operation, and results in perfect equally spaced corrugations, without injury or substantially stretching of the metal. To this end I take a flat piece of sheet metal of any shape, square, circular or otherwise, and make a hole $a$ in the center of the blank sufficiently large to allow for shrinkage. For instance in making a 24 inch wheel with twelve corrugations each 1¼ inches deep and desiring to allow for a six inch shrinkage, so that the center hole $a$ shall fit a 3 inch hub, I would make the center hole $a$ originally 9¾ inches in diameter. I then form on the periphery of the blank a series of equally spaced marks or notches 7, corresponding to the number of spokes or corrugations to be formed and in the radius of each notch 7, and adjacent to hole $a$ I make a small perforation 8; the purpose of the notch 7 and perforation 8 being to provide guide means for centering the sheet in stamping it in the press.

Any suitable form of press may be employed to stamp the sheet, and having dies as illustrated and indicated at B in the drawings; the essential feature being the male and female die members 9—10 shaped to stamp a single corrugation of desired depth and flare, and provided with a center pin 11 to fit a perforation 8 in the sheet and a guide boss 12 to fit the notch 7. I then proceed to make one corrugation or spoke rib at a time until I have all the spoke corrugations struck up, as shown in Fig. 2. The depth of the corrugations may be varied at will by simply changing the thickness of the dies. By this process it is possible to get any depth desired and at the same time the shape of the spoke or corrugation can be made to suit the fancy or needs of the operator. As each spoke is stamped by the press the sheet warps and dishes until the last is struck, when the sheet assumes again nearly a true plane, yet it is usual to place the finally corrugated sheet made by dies B, in a second press under a master die, and give it a final stamping at a single operation.

It is obvious that this process can be used for other purposes than for stamping circular blanks, as any irregular square or oblong would respond to the same treatment; the vital point being the hole in the center of the blank. It is the hole $a$ that allows the steel of the plate to shrink toward the center, and it is the making of the one rib at a time that allows shrinkage to take place for each rib.

By making the central hole $a$ large enough to allow for shrinkage during the stamping process, and stamping the corrugations singly, I am enabled to make the corrugations of any desired depth and to extend them from the central hole $a$ to the periphery of the sheet without stretching or weakening the sheet. By this method I can economically make corrugated disks for vehicle wheels according to my patent previously mentioned, which have maximum rigidity and strength and are extremely light and durable.

Having thus described my invention what I claim and desire to secure by Letters Patent is—

1. The method of radially corrugating a sheet which consists in making a hole in the sheet at the axial center of the corrugations large enough to allow for radial shrinkage due to the corrugating process, forming guideways in the sheet and then stamping the sheet to form the corrugations and simultaneously shrinking the sheet radially.

2. The method of radially corrugating a sheet which consists in making a hole in the sheet at the axial center of the corrugations, forming guideways in the sheet and then striking out each corrugation separately with the corrugation extending the full radial depth of the sheet from the hole to the periphery of the sheet.

3. The method of radially corrugating a sheet, which consists in dividing the sheet into equal sectors, making guides in each of the sectors, and forming each corrugation singly and providing for shrinkage of the sheet lengthwise of the corrugations simultaneously with the making of each corrugation.

In testimony whereof I have hereunto set my hand in the presence of two subscribing witnesses.

ANDREW W. LIVINGSTON.

Witnesses:
   JOHN H. HERRING,
   BEATRICE ABRAMS.